(12) United States Patent
Cosman et al.

(10) Patent No.: US 7,095,423 B2
(45) Date of Patent: Aug. 22, 2006

(54) SYSTEM AND METHOD FOR COMBINING INDEPENDENT SCENE LAYERS TO FORM COMPUTER GENERATED ENVIRONMENTS

(75) Inventors: Michael A. Cosman, South Jordan, UT (US); Robert C. Dawson, Salt Lake City, UT (US); Heber B. Bennion, Salt Lake City, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 108 days.

(21) Appl. No.: 10/622,884

(22) Filed: Jul. 18, 2003

(65) Prior Publication Data

US 2004/0017385 A1    Jan. 29, 2004

Related U.S. Application Data

(60) Provisional application No. 60/397,513, filed on Jul. 19, 2002.

(51) Int. Cl.
*G09G 5/00* (2006.01)

(52) U.S. Cl. ........................... 345/629; 345/630
(58) Field of Classification Search ........ 345/419–428, 345/581, 582, 629–641
See application file for complete search history.

(56) References Cited

U.S. PATENT DOCUMENTS

| 5,381,338 | A  | * | 1/1995  | Wysocki et al. | 701/207   |
|-----------|----|---|---------|----------------|-----------|
| 6,064,393 | A  | * | 5/2000  | Lengyel et al. | 345/419   |
| 6,266,068 | B1 | * | 7/2001  | Kang et al.    | 345/629   |
| 6,335,765 | B1 | * | 1/2002  | Daly et al.    | 345/629   |
| 6,650,326 | B1 | * | 11/2003 | Huber et al.   | 345/428   |
| 6,747,649 | B1 | * | 6/2004  | Sanz-Pastor et al. | 345/428 |
| 2001/0027456 | A1 | * | 10/2001 | Lancaster et al. | 707/104.1 |
| 2002/0145615 | A1 | * | 10/2002 | Moore          | 345/629   |

* cited by examiner

*Primary Examiner*—Matthew Luu
(74) *Attorney, Agent, or Firm*—Thorpe North & Western LLP

(57) ABSTRACT

A system and method is provided for combining independent scene layers to form computer generated environments. The method includes the operation of constructing a terrain layer using stored terrain data. Another operation is generating a feature layer using feature layer data that is stored separately from the stored terrain data. The feature layer and the terrain layer can then be combined to form a composite scene.

15 Claims, 3 Drawing Sheets

SYSTEM AND METHOD FOR COMBINING INDEPENDENT SCENE LAYERS TO FORM COMPUTER GENERATED ENVIRONMENTS

This application claims priority from U.S. Provisional Patent Application No. 60/397,513 filed on Jul. 19, 2002.

FIELD OF THE INVENTION

The present invention relates generally to computer generated images and simulation environments.

BACKGROUND

Visual environment databases for simulating outdoor real-world type settings can be considered geographically large. This is in contrast to the small locally contained "theaters" which are employed in the CAD/CAM, entertainment and gaming industries. Visual environment databases that are geographically large employ a thorough level-of-detail (LOD) strategy to ensure that the important geographic features and objects near the instantaneous view position or eyepoint get displayed. This process of selecting what should be drawn at various levels of detail cannot be as simple as "on" or "off" decisions about what polygons or objects should be drawn. In order to make the computer generated scene appear realistic, the distant scene is still represented, but many of the scene elements that comprise the distant scene can use simpler versions of the scene element. Furthermore, to make the distant scene more believable, the distant scene can gradually transition into an acceptable nearby scene as the eyepoint approaches. Today's simulation users and customers want the simulated environment to be uniformly rich and dense everywhere, not just at a few places of interest.

The effectiveness of the visual scene can be considered to be directly proportional to the sophistication and thoroughness of the LOD strategy employed. Fewer levels-of-detail (LODs) and poorer transition mechanisms translate to a higher image generator (IG) load, lower apparent scene density, and distracting LOD transitions or anomalies. Some of the first large-area geo-specific databases that were used a few decades ago averaged about 3 polygons per square mile. During this early era, system designers began a rigorous application of a multiple-LOD methodology and by the mid-80's database density had risen to roughly 7,000 polygons per square mile. These databases can also be geographically large. For example, a database of just the west coast of the United States can be over 250,000 square miles.

The product of database geographic density and database geographic extent yields a "virtual content" or a number of stored polygons in the database that can be astronomical. For example, 7,000 polygons/sq-mi×250,000 sq-mi yields a "virtual content" of nearly $2 \times 10^9$ polygons. In other words, the database may contain billions of polygons. This total number of polygons that could possibly be viewed is generally pared down to roughly 10,000 run-time polygons for processing by the image generator (IG). The particular 10,000 polygons that are selected for rendering and viewing are always changing as the eyepoint moves. The selection process can be thought of as a funnel with a very large mouth into which the entire database is dumped for each frame of output (e.g., 60 times a second). The IG sits at the tiny outlet of the funnel and renders the 10,000 or so polygons the IG is capable of handling. A mechanism within the funnel can decide based on the instantaneous position of the eyepoint which of the $2 \times 10^9$ input polygons to pare down to the 10,000 polygons for the IG.

This selection, culling and management mechanism is the database scene graph. The scene graph performs a range-driven hierarchical geographic subdivision of the entire database. The subdivision hierarchy is basically the LOD decision tree. Geographic areas distant from the instantaneous eyepoint are subdivided less and culled out in larger pieces. Areas near the instantaneous eyepoint are subdivided more and culled more finely. Each decision point or node of the graph allows the selection of either simpler or more complex "filler" (e.g., polygons and objects) for the geographic area represented, based on range from the eyepoint. At each node of the graph, the system basically decides whether the accompanying displayable elements are adequate for the current range, or whether further subdivision and selection is necessary. The processes just described are applied to the terrain as well as the features decorating the terrain.

When considering LOD, it is very undesirable to render the terrain at a single, fixed level of detail. For example, current system users and customers desire to have terrain detail near the eyepoint that is equivalent to a general minimum of 100 meter terrain facets. This translates to about 500 polygons per square mile. If the system visibility range is 200 miles which is not atypical, then the terrain skin alone can present about 10 million terrain triangles for a single visual processing channel. With a level-of-detail (LOD) terrain strategy that is set to a single level, a 5,000 polygon per channel terrain budget would imply 2 mile terrain facets. Unfortunately, the world is pretty bland when sampled this coarsely. Accordingly, the terrain skin itself is more effective with a range-driven hierarchical level of detail.

Using a range-driven LOD for the terrain creates problems because the non-terrain scene features are geometrically attached to the terrain. This means that the non-terrain scene features (e.g., buildings, roads, etc.) are incorporated into the scene graph and controlled by the terrain LOD strategy. The terrain LOD strategy thus becomes the single controlling mechanism to which all other feature behavior is subordinate. Accordingly, every scene feature is merged into the scene graph at the terrain node that contains it, and at a terrain LOD for a range consistent with the desired LOD behavior of the feature. In general, this means that the feature can spring into visual existence only after its underlying terrain has reached the highest LOD. When this distracting behavior is observable by an end user, this instant appearance of a feature is sometimes known as feature "pop-up".

If a feature is desired to exist at more distant ranges, the feature must be simultaneously attached to the graph at two or more terrain nodes (or one node for each LOD). This complicates the LOD evolution of the underlying terrain. Attaching features at multiple terrain nodes also creates the problem of what the feature should do while the graph is executing a fade between branches, and the fade is applied hierarchically to everything further down on both branches.

One practical effect of these difficulties is that the simulation modelers may design the terrain to arrive at its highest LOD too far away, which wastes IG capacity. On the other hand, delaying some feature introduction until the features are too close can cause visual distraction. Furthermore, simulation modelers are naturally, but reluctantly, led to avoid terrain strategies with small final facets because these small facets would normally work best with fairly close transition ranges. There are also particular problems with the application of scene features that necessarily straddle multiple terrain facets (roads, etc.), and those features such as point lights that must be introduced into the scene at long range, yet remain attached to the terrain. As a result, a number of capabilities increasingly demanded by end users and customers have simply not been possible or implementing certain features has been intractably difficult. In the meantime, database sizes have grown to terabytes and compilation times have grown to CPU months. Notwithstanding this, the geographic density remains at 1985 levels.

Geographic density has not been able to increase because there is a single database graph, and the database syntax ("schema") must be rich enough to accomplish the control functions for all the types of scene features that may be incorporated into the database. Two consequences of this are that the graph walk itself is more complex and compute-intensive than it would otherwise be, and changes to the schema require a full database rebuild. In addition, since the graph is significantly affected by the selected terrain LOD strategy and geometry, any changes to the terrain require a complete database rebuild or recompile. The graph provides the range-based LOD decision mechanism, and this mechanism is "global" in that LOD decisions apply hierarchically to all subordinate scene elements. Thus, there is basically one LOD control or "throttle" which can manage the image generator (IG) overload, and all the scene features respond to the LOD control uniformly. Having only one LOD retains or discards features in a way that is not necessarily gradual when there is an impending processing overload. Further, the iterative process of matching the database load to the IG capacity involves wholesale database rebuilds with little fine-tuning control.

Scene features are assigned to nodes in the graph based on their geographic position. These relationships are fixed at database compile time. Thus lateral betweening or lateral movement of features is generally prohibited at run time. Regrettably, lateral betweening is particularly suited to the LOD simplification of vector-based features. In fact, any run-time lateral adjustment of any feature may cause a visual conflict, so even simple or otherwise solvable adjustments are disallowed. Features that involve complex interaction with the terrain (e.g., road cuts and fills) are entirely clipped and placed (or "solved") at compile time, and the appropriate controls are frequently embedded into feature vertices to allow run-time vertical betweening of the terrain. This makes run-time modification of the terrain problematic. Users of ground warfare simulations want to conduct long simulations that involve terrain-modifying processes. Examples of events that may modify the terrain are bomb craters, bulldozers, creating berms, etc. Unfortunately, existing features that are already clipped, conformed and linked to the terrain in the graph are not typically able to respond to these dynamic changes.

The clipping and conforming processes generate additional compile-time geometry that must be stored and later retrieved. This additional geometry is partly responsible for the huge increase in stored database size. These complexities also become part of the schema problem. In the end, the modeling tools being used increase in complexity and interdependence, resulting in an integrated but unwieldy suite of tools that is expensive, difficult to maintain, complicated to extend, and resource-hungry.

The debug of such databases is also complicated by the all or nothing nature of the single, compiled database graph. If there is a major error in the database graph, the system might not display any image at all, and the visual anomalies connected with graph errors may not be intuitively connected to the source of the error.

SUMMARY OF THE INVENTION

The invention provides a system and method for combining independent scene layers to form computer generated environments. The method includes the operation of constructing a terrain layer using stored terrain data. Another operation is generating a feature layer using feature layer data that is stored separately from the stored terrain data. The feature layer and the terrain layer can then be combined to form a composite scene.

Additional features and advantages of the invention will be apparent from the detailed description which follows, taken in conjunction with the accompanying drawings, which together illustrate, by way of example, features of the invention.

DETAILED DESCRIPTION

Figure 1:
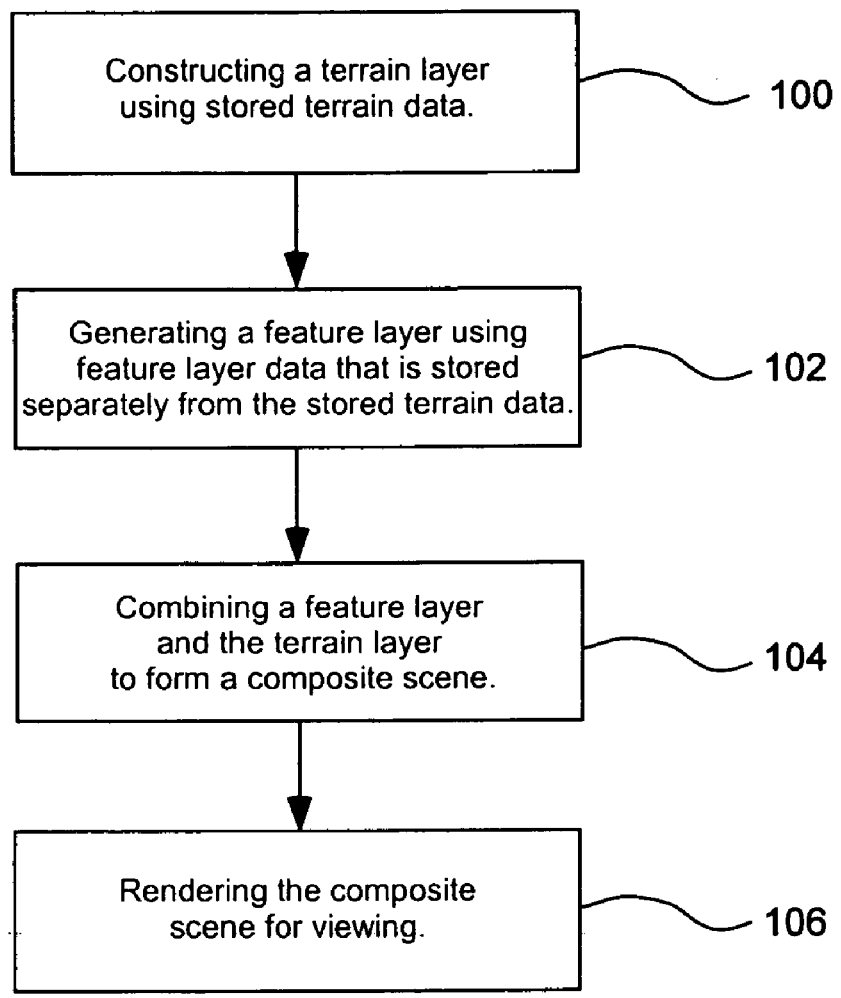
FIG. 1 is a flow chart illustrating an embodiment of the invention for combining independent scene layers to form computer generated environments.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention is a system and method for generating imagery for a visual environment by combining several layers of scene environment data from one or more databases at run time. A layer can be the terrain skin, the global texture applied to the terrain, a network of 2D features such as roads, a set of 3D features such as buildings or trees, etc. Scene layers are applied in an appropriate sequence that accounts for their interaction with each other, and after culling for field-of-view and level-of-detail. Each layer can be designed and optimized for its contribution to the visual scene, so the resulting composition achieves better visual results with fewer image generator (IG) resources. In addition, conflicts between layers can be resolved at run time, allowing each layer to be largely independent of other layers, and further reducing the amount and complexity of stored data.

As opposed to using one integrated database, the present system and method uses several separate databases that can be combined at run time. In this context, run-time is generally defined as system processing other than the compile-time assembly and modification of the databases. Each database may include scene features of a related type that share similar attributes with regard to their level-of-detail (LOD) behavior and interaction with the terrain. This creates a terrain that does not require fade level-of-detail and the occasional presence of two terrain facets in the same place.

The present invention also provides a robust mechanism for combining the scene features of each database with the terrain, and accounting for their interactions and conflicts. These underlying mechanisms provide a way to efficiently and rapidly search the progressively developing composite scene result to properly add additional scene elements. This searching can be accomplished at real-time or near-real-time rates.

FIG. 1 illustrates one embodiment of a method for the present invention. The method includes the operation of constructing a terrain layer using stored terrain data 100. Another operation is generating a feature layer using feature layer data that is stored separately from the stored terrain data 102. The feature layer and the terrain layer can then be combined to form a composite scene 104. Once the composite scene has been created then the scene can be rendered by the system's rendering engines for viewing 106. As mentioned, not just one feature layer can be used, but a plurality of feature layers can be generated and each feature layer can include scene features with underlying common characteristics. Each feature layer includes features that have coordinates on the terrain layer or in the environment.

Using multiple terrain and/or feature layers allows each layer to implement its own run-time response to graphics system overload, and the response may be coordinated by the real-time system at a global level. This layered response allows the system to respond logically and imperceptibly to changing graphics processing loads by simplifying the scene in subtle and layer-dependent ways that minimize the visual distraction of overload management. In effect, every layer has its own LOD control or "throttle". For example, the system can favor the elimination of trees in order to preserve terrain fidelity, etc. Using this strategy, a group of layered databases can thus be made to run with a wide range of scene densities and IG loads.

Another benefit of the present system is that the system modeling time is reduced and the software modeling tools are simplified by separation into layers. Each scene layer can be modified and compiled independently, which significantly reduces the time required to polish a database, and avoids the huge global re-compiles applied to a monolithic database. Similarly, the real-time software that implements each layer can be modified independently of the rest of the run-time code. Both the modeling tools and the run-time software become fundamentally modular and configurable, and this makes them easier to modify and extend. This modularity can also provide more of a plug-in type of arrangement for the software modules. In addition, the problem of database schema changes is localized and largely eliminated.

Figure 2:
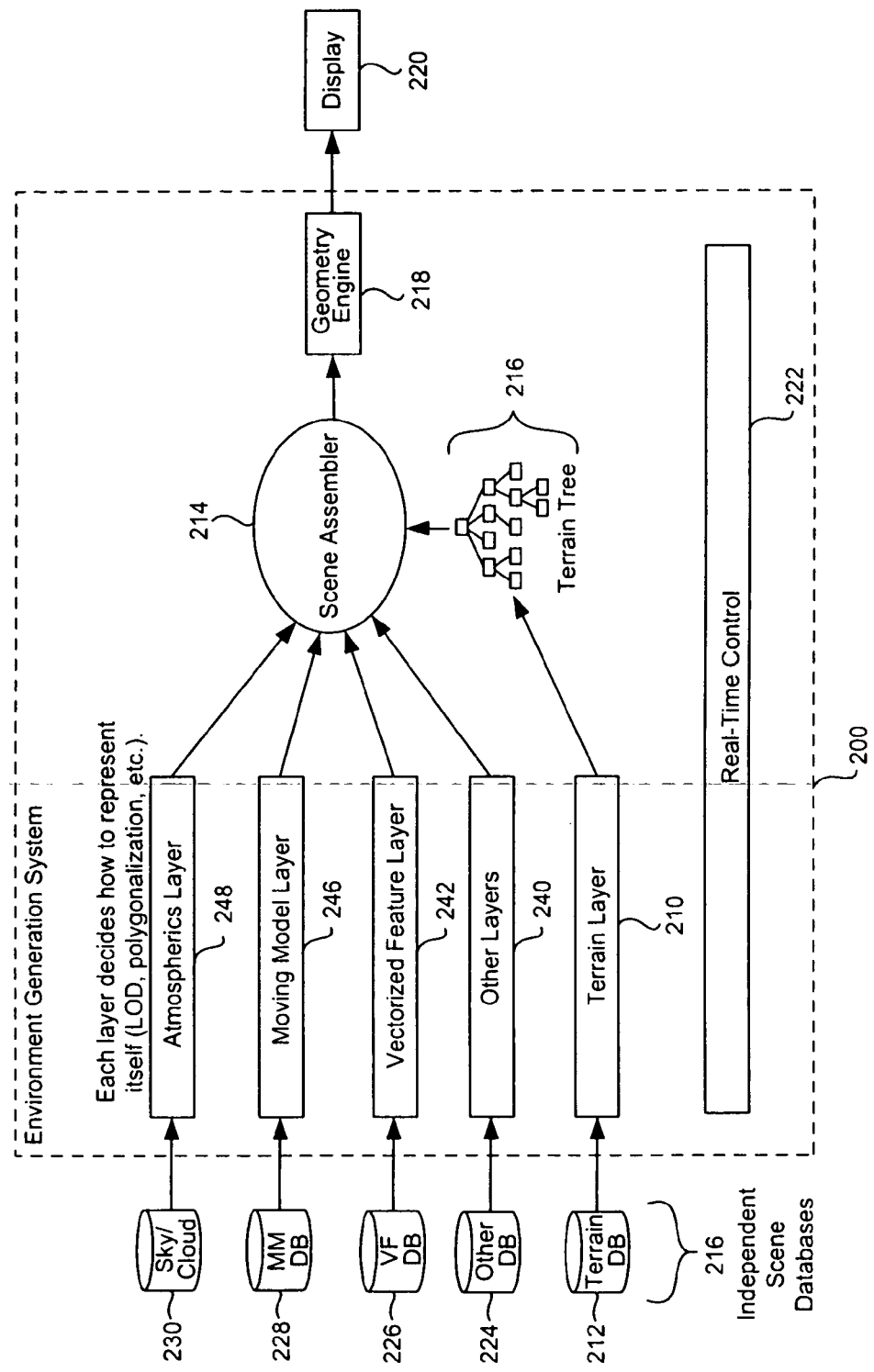
FIG. 2 is a block diagram illustrating a system for combining independent database layers to form computer generated imagery for an environment in accordance with an embodiment of the present invention.

FIG. 2 illustrates a block diagram of an embodiment of a system for combining independent scene layers to form computer generated environments. The aggregated system can be described as an environment generation system 200 or an independent scene layer assembly system. The system can include a terrain processor that can read a terrain layer 210 from a terrain database 212 which stores the terrain layer and terrain layer data. The terrain processor can store the terrain layer that has been generated in a tree data structure 216. For example, the terrain processor can construct a terrain quadtree data structure that defines the instantaneous terrain geometry and provides a searching and sorting mechanism.

Layers are also provided that are separate and independent scene feature databases with their associated processors. Each layer can have a feature database that is separate from the terrain database and is configured to store a feature layer. A scene assembler 214 is included that can perform the composition of scene features as they are received from the layers and merge the results into the terrain tree data structure 216. Although a quadtree can be used in one embodiment of the invention, other tree data structures can be used such as an octree, binary tree, or some other tree data structure known to those skilled in the art. The scene assembler can be configured to receive the terrain layer 210 from the terrain database 212 and a feature layer from a feature database in order to combine the terrain layer and feature layer into a composite geometric result.

The final results from the scene assembler can be submitted to a geometry engine 218 for geometric transformation and the rendering engines (not shown) for rendering. A real-time control system 222 is provided that orchestrates the process repetitively for each new computational frame, and the real-time control system is configured to generate polygons for the composite image for each computational image frame. The completed computer generated images are then output to the display 220.

The real-time scene assembly system calls the layers in a controllable sequence. Typically, layers containing terrain modifiers are sent first, so their effects can be appended to the terrain tree. From there, the order is generally by visual priority—elements on the terrain come before 3D elements, etc. There can also be a general structural or composition priority: terrain, terrain modifiers, terrain texture, terrain coplanars, point features, lineal features, areal features, sky, and then other feature elements. When all layers have been submitted, the real-time control system 222 processes the decorated quadtree into a display list of polygons suitable for rendering by the image generator.

The present invention includes a plurality of feature databases that are configured to be combined together and applied to the terrain data structure. Each database layer comprises a database with its own schema, and an associated processor that submits the scene features of the layer to the scene assembler. The associated software processor can be shared between multiple layers where appropriate. A layer typically comprises scene features that have some underlying common characteristic that can be exploited by grouping them together.

FIG. 2 illustrates a number of example layers that may be incorporated into the environment generation system 200 of the present invention. In most embodiments, the terrain layer 210 and the terrain database 212 will form a base layer, although this is not a requirement because the terrain may be provided in multiple layers. A moving model layer 246 that is in communication with a moving model database 228 can generate moving 3-D models for submission to the scene assembler. A vectorized feature layer 242 and a vectorized feature database 226 can be used to supply features such as roads, rivers, and similar vector type of features. Both the moving model layer and vectorized feature layer can be combined with the terrain layer. An atmospherics layer 248 and atmospherics database 230 can be used to generate cloud layers, storms, snow, and similar atmospheric features that will be included in the environment. Other additional layers 240 and databases 224 can be included as suggested by this disclosure (e.g., static 3-D models, textures, etc.) or additional layers may be created by those skilled in the art. Each layer 210, 240, 242, 244, 246, 248 represents the data and data structures read from their respective database and the data is processed to create the given layer. Each layer may have its own physical processor to create the layer or the layers may share one or more physical processors.

For example, a layer can provide all the individual trees for an entire database. These trees or features can be represented as positions and type codes, with a run-time expansion into tree stamps as appropriate for the current eye position. Such point features may be organized as a geographic quadtree for purposes of field-of-view (FOV) and LOD culling. The quadtree may also be optimized for quickly rejecting large geographic areas that are too distant to result in any visible trees.

A feature layer optimized for drawing all the major highways in a database may be organized using highway type codes and vertex strings to define the road path and construct the actual highway polygons at run time. Such polygons may be optimized for the particular eye position. The example highway layer described may use lateral betweening to simplify distant representations of roads. The FOV and LOD culling strategy are different than the tree layer, and can be optimized for continuous linear features that preferably have some visual representation over large visual ranges.

Another example of feature layers is separating the features into 2-D feature databases and 3-D feature databases. The 2-D feature databases can include features such as a model texture database, a terrain texture database, a road feature database, a runway feature database, and a shadow feature database. The 3-D feature database may include databases such as a building database, a tree database, a foliage database, a vehicle database, a utility structure database, a road cut database, a crater database, a land-fill database, an airport skirt database, and a people database.

The present invention supports an indefinite number of layers, any of which can be "activated" or sent to the scene assembler at run time. This simplifies the development and debug of databases, because the modeler can remove all the extraneous elements or layers from the scene and concentrate on the elements being changed. The FOV and LOD behavior of the features within each layer are independent of both the terrain and other layers that are simultaneously active. In addition, each database layer has a custom, optimized schema that can be changed without modifying or rippling into the other layers.

The system and method of the present invention can make better use of the limited IG capacity, because the system supports independent, optimized LOD strategies for every feature type or layer. Using separate layers does not co-mingle and compromise the LOD scheme as compared to a monolithic LOD that conforms to a single schema and database graph strategy.

In one embodiment, the terrain processor continuously constructs a snapshot of the entire terrain skin as a single triangular mesh from the instantaneous eyepoint to the visibility limit. Within this mesh, terrain that is closest to the eyepoint is generally rendered with small triangles. Terrain farthest away from the eyepoint is generally rendered with larger triangles. The terrain processor also uses a local roughness measure for the terrain to create smaller triangles in areas where the terrain is changing rapidly, and larger triangles where the terrain is smooth. As the eyepoint moves, areas being approached by the eye are subdivided into finer triangles, and areas being left behind are coalesced into coarser triangles. This subdivision process is performed hierarchically, and an area is subdivided into a finer triangular mesh that exactly fills the geographic area of the coarser parent mesh. Then as the eyepoint continues to approach, the finer mesh is in turn further subdivided.

The triangles of the terrain model share vertices perfectly, so there are no slivers or cracks between adjacent areas of coarse and fine triangles. This LOD strategy always provides a transition region of triangles that properly connect small and large terrain facets. Morphing can also be used to effect level of detail transitions. When morphing is used, new vertices are introduced as needed, originally in the plane of the parent polygon, then gradually raised or lowered to their final position at the new level of detail. The terrain processor can create a visual model containing many levels of detail, optimally deployed to capture the actual terrain topography with the smallest number of triangles, and with imperceptible LOD transitions that do not burden the rendering engine with fades and overlaps.

One possible subdivision strategy that can be employed by the terrain processor creates a 2D quadtree. The quadtree subdivides every geographic region (i.e. node) into four contiguous regions (nodes) that exactly fill the parent space. The subdivision is based on range from the eye. This subdivision strategy is also based on information stored within the terrain model, such as terrain roughness, and other factors deemed beneficial to the operation of the process and optimization of the visual result. At the terminal nodes of the quadtree, (the highest LOD required for the instantaneous viewing situation) each rectangular region is tiled with a triangular mesh.

The terrain quadtree is a data structure that can be used by the scene assembler to decorate the terrain skin with features. The use of a quadtree allows the scene assembler to quickly discover exactly what terrain facets underlie a particular scene feature. The search process begins at the top node of the quadtree, which is the root node containing the entire instantaneous terrain snapshot. The scene assembler determines which quadrant of the node contains the test point, and whether that node is a terminal node or continues to subdivide. If the node subdivides (i.e., has child nodes), then the process recurses or repeats again with the child node as the main subject. When the terminal node containing the test point is finally discovered, the configuration of terrain facets for that node is interrogated to find the single facet containing the test point.

Because the search process is hierarchical, it is an efficient search. A large, very detailed terrain model may have a dozen levels of detail. Thus, for a test point near the eye, only twelve quadrant tests would need to be performed. The quadrant test is performed in 2D, which is a further mathematical simplification. Once the terminal terrain facet is found, the position and height of the terrain facet's vertices can be used to compute the relationship of the test point (and any scene feature it is part of) to the terrain. Using a terrain tree allows the system to apply or plant features onto the terrain skin and transfer terrain characteristics to the feature. For example, shadow and shading information can be transferred from the terrain to the feature.

Figure 3:
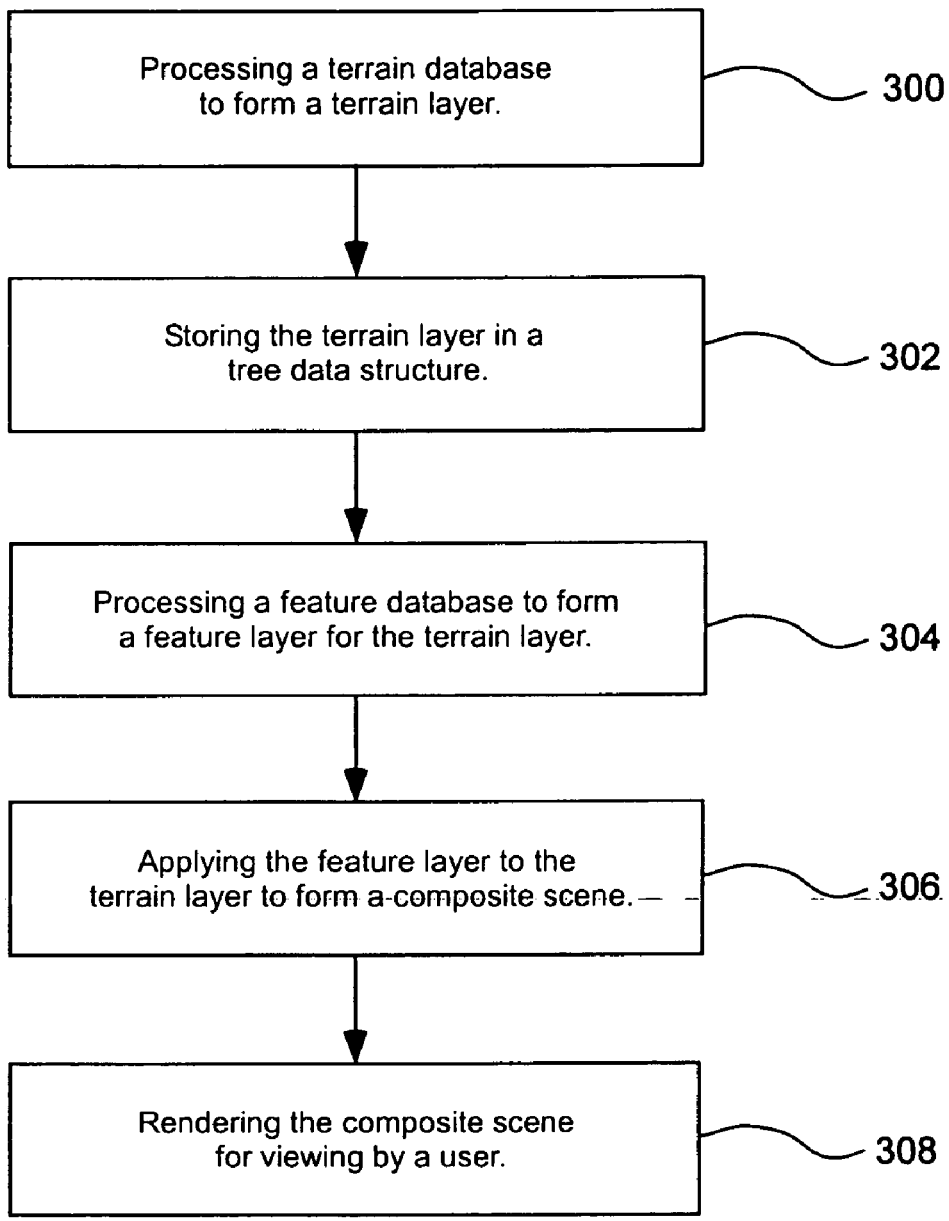
FIG. 3 is a flow chart illustrating a method for combining independent scene layers using a terrain tree to form computer generated environments and associated imagery.

FIG. 3 is a flow chart illustrating one method for combining independent scene layers to form computer generated images for an environment. The method includes the operation of processing a terrain database to form a terrain layer 300. The terrain layer can be stored in a tree data structure 302. As discussed, one embodiment of the invention uses a quadtree to store the terrain layer. The use of the quadtree enables faster searching of the entire environment and allows features to be quickly appended to the terrain facets, terminal nodes of the tree structure or environment locations where they belong. A further operation is processing a feature database to form a feature layer for the terrain layer 304. The processed feature layer can then be applied to the terrain layer to form a composite scene 306. Once a composite scene has been generated, the composite scene can be rendered for viewing by a user 308.

The use of clipping in the present invention will now be discussed in combination with a quadtree. The scene assembler can use a terrain quadtree to clip feature polygons into the polygon portions contained within each terrain facet. This conforms scene features onto or relative to the terrain. Each node of the quadtree contains boundaries that separate a given portion of the environment into its four child nodes. These boundaries are used as clip planes to subdivide feature polygons into the polygon portions in each node or quadrant. At the terminal nodes of the quadtree, additional boundaries or clip planes define the actual terrain facets, and feature polygons are further clipped against these planes to get the portions associated with each terrain facet. This clip process is generally hierarchical. As a feature polygon is clipped, the resulting fragments can be further processed only for the specific nodes they occupy. The clipping process also ensures that the resulting mesh of feature polygon fragments fully shares vertices and is free of cracks.

A Z-buffer can be used with the present invention, although other hidden surface methods can be used if desired. Current image generation techniques desire to employ a Z-buffer to remove hidden surfaces because it is a cost-effective hidden surface removal technique. Unfortunately, such Z-buffer hardware generally has difficulty resolving coplanar polygons. The scene assembler provides critical assistance here by properly associating terrain-coplanar feature polygons with the terrain facets they cover. This allows the rendering hardware to use auxiliary mechanisms to assist the Z-buffer.

To enable the rendering hardware to assist the Z-buffer, the scene assembler links clipped feature polygons with the particular terrain tree node and terrain facet they occupy. The scene assembler does this by appending additional information into the tree data structure (e.g., quadtree) as terminal nodes and facets are discovered. This information allows the output process to properly identify and sequence coplanar polygons with the appropriate rendering information. Storing the coplanar polygons in the tree structure at the appropriate location also means that conformed feature polygons will get output in the same order as the terrain skin. Thus, the output sequence can be pre-determined and manipulated to also assist the efficiency of the rendering hardware.

The attachment of clipped feature polygons to the terrain tree provides another powerful capability. Some features can be designated as terrain modifiers. For example, craters, road cuts and fills, airport skirts, etc., can be terrain modifiers. These terrain modifier features may be sent to the scene assembler before other types of scene features, and the terrain modifier features are clipped and linked into the quadtree. As a result, these features will already be present when other types of feature polygons are processed. The scene assembler can detect these terrain modifiers, and apply more sophisticated conforming processes that cause features added after the terrain modifiers to respond to the modified terrain. For example, buildings and trees can rest on the modified terrain, and vehicles can follow the modified (not the original) terrain surface.

The ability to provide run-time feature-based terrain modifiers provides a significant edge in the ground warfare simulation market. Further, run-time terrain modifiers allow the creation of a database layer whose primary job is to capture the accumulating set of terrain modifications that result from an ongoing combined-arms exercise. The result of this dynamic layer allows late entrants into a simulation battle to be instantly apprised of the environment "degradation" from prior battle action.

The present invention can also assist in optimizing field-of-view (FOV) culling. The terrain processor can create a single field-of-view-independent terrain tree or quadtree that several rendering channels can use. Alternatively, the terrain processor can create several channel-specific quadtrees that include FOV culling. This is done by putting null node pointers in the terrain tree for nodes that have been culled out. As scene features are conformed onto the terrain, those that lie on portions of the terrain that have been removed can similarly be rejected, thus transferring FOV cull information to the feature databases in a unified and efficient way.

Another valuable aspect of the present invention is feature-to-feature interaction. Because scene features from different layers are sent at run time to the scene assembler, the clipping and sorting processes can provide a way for the scene assembler to understand how the features interact and sometimes conflict. As features are clipped and conformed to the individual terrain facets they affect, prior feature polygons linked to these same facets can be interrogated to determine different types of responses. For example, if the tree layer discovers that a tree is being placed on top of a road, the layer or scene processor can detect this conflict and eliminate the tree. If the tree is being placed on a tread mark left by a tank, the layer can substitute a fallen tree, etc.

Providing a system and rules that enable the layers to interact at run time, allows scene layers to be created much more independently of each other. Further, these interactions allow the population of the composite scene using interaction rules that can be easily changed and optimized. It is even possible to accommodate some out-of-order submissions, since polygons already (and maybe erroneously) linked to the terrain tree can be eliminated or modified by subsequent submissions from later layers. The ability to sort and reorder scene polygons at the terrain facet level helps properly and rigorously solve problems normally associated with the Z-buffer and screen coverage optimization.

The system and method for the present invention also provide new approaches to environment modeling. Because the feature overlay does not have to be clipped and conformed to all possible LODs and configurations of the terrain model at compile time, "parametric" models can be actually implemented in the system. Compact vector-based definitions of complex scene features can be expanded by layer code at run time into just the polygons needed for the instantaneous eyepoint, after FOV culling and proper LOD determination. Using these more effective and space saving modeling techniques, the stored form of the database shrinks dramatically. In some situations, the database may be as small as 1% of the size of previous similar databases. New layers can be devised and implemented with relatively less effort and incorporated into the full system easily.

The present invention also provides rapid search capabilities using the terrain tree or quadtree. This search capability greatly enhances the ability to perform simulation mission functions such as determining height-above-terrain and collision detection. By using the quadtree to reduce a huge $n^2$ problem into a number of smaller $m^2$ problems, more of these functions are calculated in the same amount of time, which improves the system's accuracy, thoroughness, and latency of response. Additional capabilities that were not available before, such as, trafficability, laser range finding, and line-of-sight occlusion or masking have become straightforward. Trafficability provides the ability to determine what kind of surface is underneath or generally below the test point.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for combining independent scene layers to form computer generated environments, comprising the steps of:
   constructing a terrain layer using stored terrain data;
   generating a feature layer using feature layer data that is configured to be modified independently and stored separately from the stored terrain data;
   applying different run-time response rules to the terrain layer and the feature layer;
   combining the feature layer and the terrain layer to form a composite environment; and
   rendering the composite environment for viewing.

2. A method as in claim 1, wherein the step of generating a feature layer further comprises the step of generating a plurality of feature layers that are configured to be combined together with other feature and terrain layers.

3. A method as in claim 1, further comprising the step of determining the locations of features in the feature layer in reference to the terrain layer.

4. A method as in claim 1, wherein the step of rendering the composite environment for viewing further comprises the step of resolving conflicts between layers.

5. A method as in claim 1, further comprising the step of defining different run-time response rules for the terrain layer and the feature layer.

6. A method as in claim 5, wherein the step of defining different run-time response rules for the terrain layer and the feature layer further comprises providing a level-of-detail control for the terrain layer and a separate level-of-detail control for the feature layer.

7. A method as in claim 5, wherein the step of defining different run-time response rules for the terrain layer and the feature layer further comprises specifying a field-of-view control for the terrain layer and a separate field-of-view control for the feature layer.

8. A method as in claim 1, further comprising the steps of:
   modifying the feature layer; and
   recompiling the feature layer independently from the terrain layer.

9. A method for combining independent scene layers to form computer generated environments, comprising the steps of:
   a. constructing a terrain layer using stored terrain data;
   b. generating a feature layer using feature layer data that is stored separately from the stored terrain data;
   c. combining the feature layer and the terrain layer to form a composite environment; and
   d. defining a run-time response rule for the terrain layer and a different run-time response rule for the feature layer.

10. A method as in claim 9, wherein the step of defining different run-time response rules for the terrain layer and the feature layer further comprises providing a level-of-detail control for the terrain layer and a separate level-of-detail control for the feature layer.

11. A method as in claim 9, wherein the step of defining different run-time response rules for the terrain layer and the feature layer further comprises specifying a field-of-view control for the terrain layer and a separate field-of-view control for the feature layer.

12. A method for combining independent scene layers to form computer generated environments, comprising the steps of:
   constructing a terrain layer using stored terrain data;
   generating a feature layer using feature layer data that is configured to be modified independently and stored separately from the stored terrain data;
   combining the feature layer and the terrain layer to form a composite environment; and
   defining a run-time response rule for the terrain layer and a different run-time response rule for the feature layer.

13. A method as in claim 12, further comprising the step of rendering the composite environment for viewing.

14. A method as in claim 13, wherein the step of rendering the composite environment for viewing further comprises the step of applying different run-time response rules to the terrain layer and the feature layer.

15. A method as in claim 13, wherein the step of rendering the composite environment for viewing further comprises the step of resolving conflicts between layers.

* * * * *